3 Sheets--Sheet 3.

A. K. LEE.
Turpentine Stills.

No. 138,508. Patented May 6, 1873.

Attest:
Edwin James
R. V. Gordon

Inventor:
Archibald K. Lee
per J. E. P. Holmead
Attorney.

UNITED STATES PATENT OFFICE.

ARCHIBALD K. LEE, OF GALVESTON, TEXAS.

IMPROVEMENT IN TURPENTINE-STILLS.

Specification forming part of Letters Patent No. 138,508, dated May 6, 1873; application filed April 12, 1873.

*To all whom it may concern:*

Be it known that I, ARCHIBALD K. LEE, of the city and county of Galveston and State of Texas, have invented certain new and useful Improvements in Apparatus for Distilling Turpentine, of which the following is a full, clear, and exact description, reference being had to the accompanying drawing and the letters of reference marked thereon making part of this specification, in which—

Figure 1:
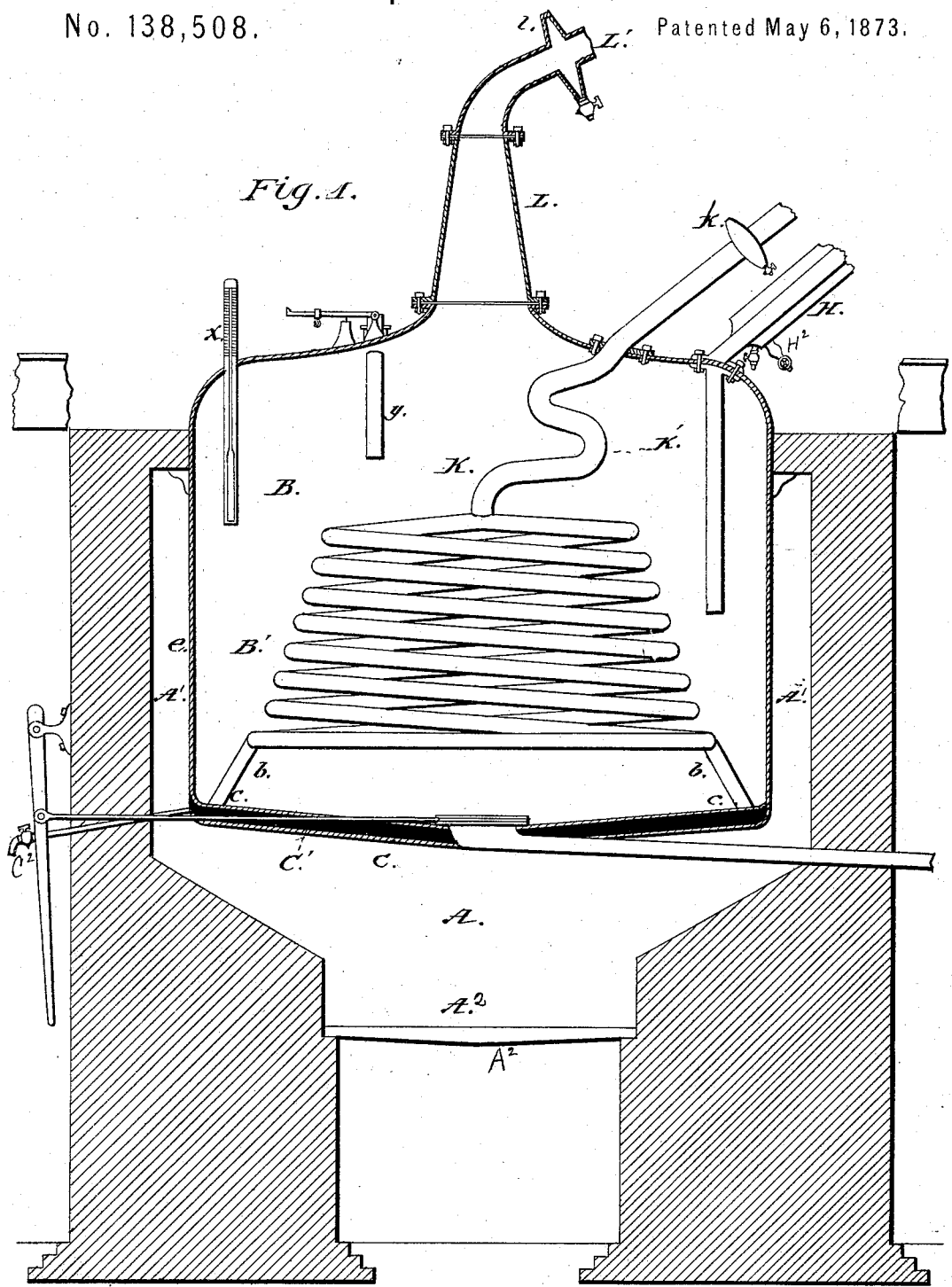
Figure 2:
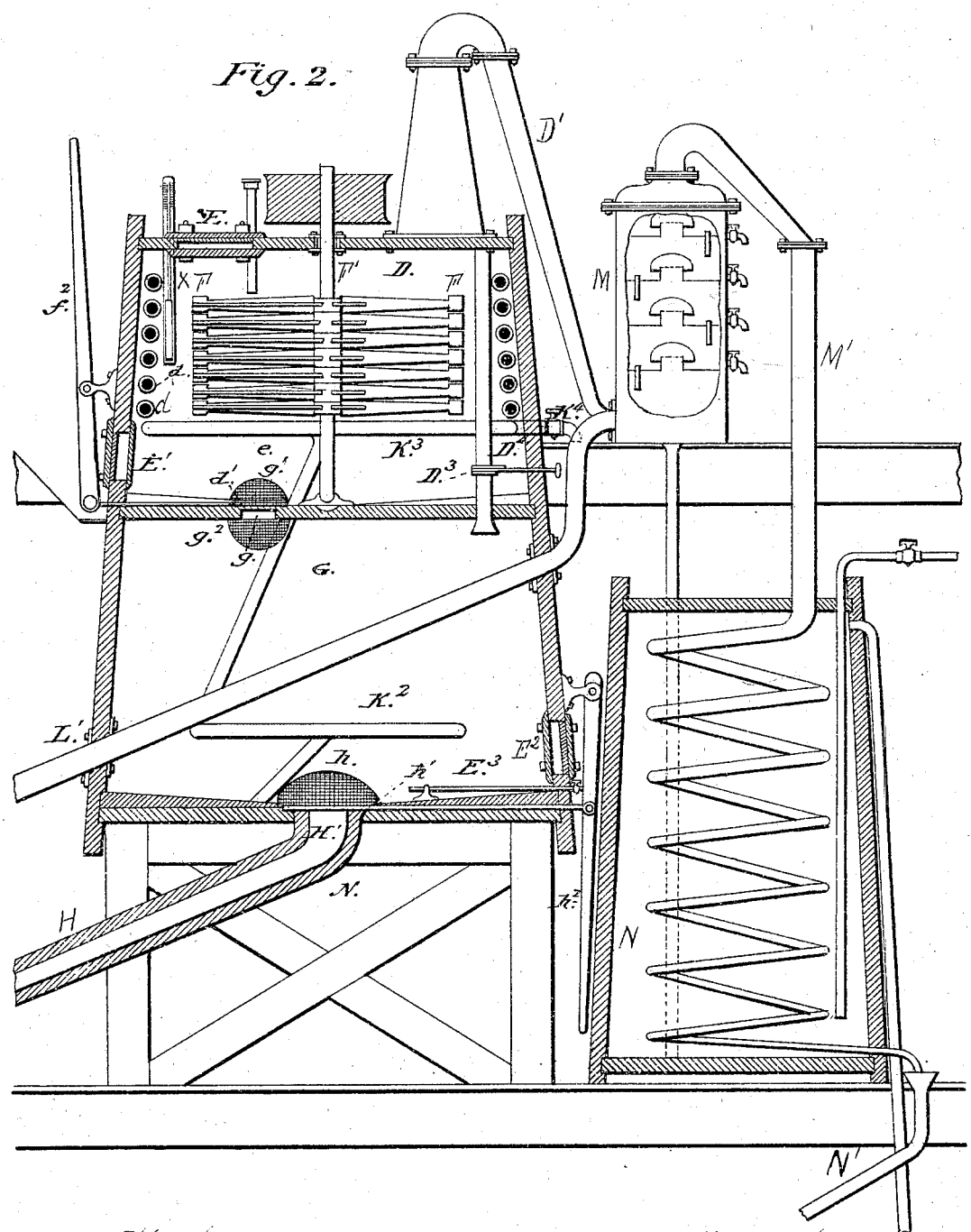
Figure 3:
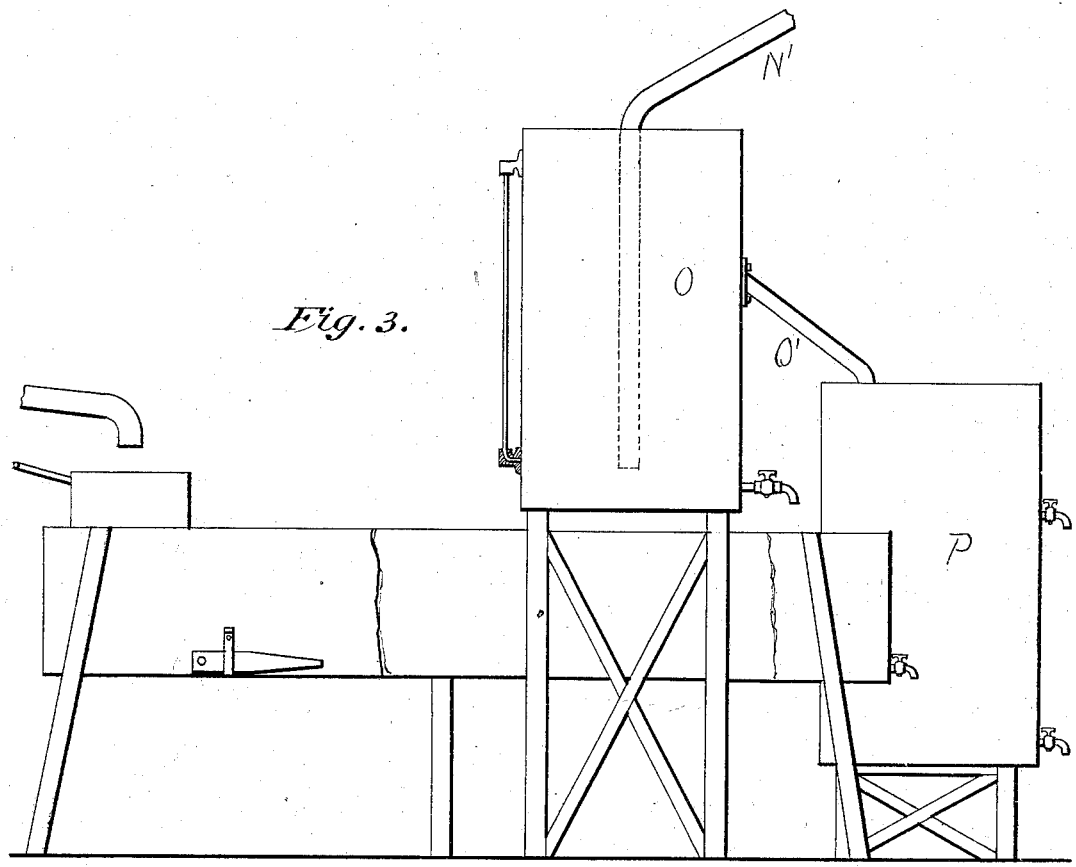
Figure 4:
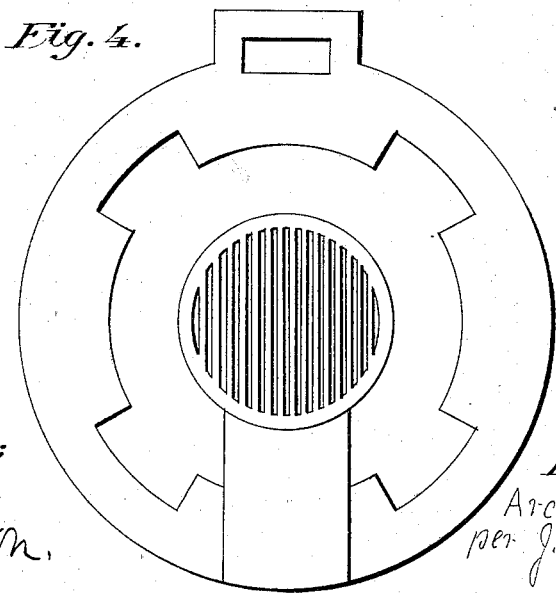

Figure 1 is a vertical sectional view of the still and furnace. Fig. 2 is a vertical sectional view of the liquidizing chamber, reservoir, separator, and worm. Fig. 3 is a vertical sectional view of the resin-box and turpentine-box. Fig. 4 is a plan view of the bottom of the furnace.

My present invention relates to an improvement in distilling and purifying turpentine, and bleaching and refining the resin or residuum thereof, producing at less cost and in a more effectual manner, from resinous substances or the crude turpentine obtained in the usual way directly from the tree, a pure and limpid article of turpentine, and one that has qualities and properties, especially as a solvent, that no turpentine heretofore manufactured by any known process ever possessed, and which as a chemical compound is in itself entirely new; and, besides, the resin or residuum left after the thorough evaporation of the turpentine and pyroligneous acid and water has been effected is so bleached and refined that when drawn off as an article of commerce, and when made from common scrape or hard-crude, is equal to the pale resin made from virgin dip by the old process, and when made from yellow dip grades, as window-glass.

My present improvement in principle is similar to the invention embraced in and covered by the reissue, dated April 15, 1873, of my patent No. 131,550, and is simply designed to enlarge the scope of the invention and to remedy defects which practical experiment has shown exist in my former apparatus.

My present invention consists, first, in using in connection with the still and its superheating steam-jacketed chamber a cone-shaped worm instead of the steam-coil claimed in my former patent, and which in the practical working of the apparatus has been found to be of great advantage, as the open spaces between the coil in connection with the irregular form of the worm present an immense heating surface for the liquid and vapor to impinge against, which greatly facilitates the action of the still in securing the thorough and rapid evaporation of the liquid, and at a degree of heat so low as to render it impossible that any vital element or property of the turpentine shall be impaired or destroyed, and which also avoids the blackening of the resin or residuum, which a high heat always does; and yet the heat is sufficient to so free the liquid from its fluid particles that when the residuum is drawn off it is perfectly clear, and known to the trade as "extra pale" and "window-glass," instead of opaque, as was the liquid when it entered the still.

My improvement also consists, as in the reissue before referred to, in running the pipe from the still through the intermediate chamber or reservoir, and also through the liquidizing-tub. In my present improvement, however, the sections of the pipe that lie within the tub and reservoir are not perforated as in my former application, and consequently in connection with these vessels or chambers it simply acts as a heater. The superheated steam that is fed from the worm through this pipe throws off an immense heat, which is a great advantage both in the reservoir and liquidizing-tub, as it insures that the liquid supplied to the former shall always be kept in proper condition of liquidization to be fed to the still, while in the latter the heat from the superheated steam in the pipe serves greatly to facilitate and hurry the liquidization of the crude material; and, besides, the superheated steam not being wasted by the numerous jets in both reservoir and tub, as in my former patent, it can be conveyed directly to a steam-chest or cylinder, and thus utilized to run the engine that drives the stirrer or agitator, and also as a motor for the elevator that conveys the crude material to the liquidizing-tub.

My improvement also consists in connecting the liquidizing-tub and reservoir each, as well as the still, with the vessel that separates the pyroligneous acid from the turpentine while in vapor. This is a great advantage, especially in such an apparatus as hereinafter described. For the liquidizing-tub, owing to the heat, steam, and agitation to which the crude material is subjected, and the heat from the worm-pipe as well as the vapor-pipe in the reservoir, renders, in a degree at least, each of these vessels a vaporizing-chamber. My invention in this particular consists in providing an escape for the vapor to the separator the moment the same is generated, and it matters not in which of the series of vessels it is produced. This insures that no portion of the material shall be an instant longer subjected to heat than its evaporation requires. Thus throughout the continuous stages of the process each and every particle of the crude material is vaporized at the lowest possible degree of temperature that can possibly effect that result.

My invention also consists in a peculiar form of stirrer or agitator so secured to a vertical shaft as to permit of its rapid revolution, while its strength and the contour of its arms is such as to insure the most positive disintegration of the mass, which is thus in broken particles or portions subjected to the direct action of the heat and steam, and which, of course, insures a much more rapid liquidization of the crude material, and at a much lower temperature, than the steam and heat would effect were the same caused to act on the crude material in bulk or without agitation. As was said in the opening of this recital, the present invention operates on the same principle as the invention embraced in and covered by my reissued patent of April 15, 1873—that is, a continuous and uninterrupted distillation is effected in a single apparatus, and one in which each and every stage of the process of distillation or evaporation, as well as the separation of the pyroligneous acid from the turpentine, and the further separation of the water from the same after leaving the condenser is all carried on at one and the same time; and which results in the production of an article of pure turpentine far superior to either the spirits or oil of turpentine now used, and which for medicinal purposes is superior to the oil of terebinthinæ, or the turpentine of commerce redistilled with potash. As a solvent it is unequaled as copal, asphaltum, and other gums, readily and speedily yield to its action, and produce the finest qualities of their respective varnish without heat and without the use of alcohol. Further reference to this solvent, and its advantages and uses, is reserved for a subsequent application of which it is to be the distinctive subject-matter.

In the use of this apparatus I have demonstrated the fact that if the distillation or vaporization of the crude material is effected by agitation and the action of steam, and at a comparatively low degree, the residuum is not black resin, but is equal in quality to the best pale resin which the "virgin dip" produces. But the bleaching of resin by agitation and the direct action of steam and heat, I propose a'so to make the subject-matter of an independent application, wherein I propose to claim these agents alone or in connection with the use of the fumes of sulphur or chlorine.

The construction and operation of my invention are as follows:

A is the furnace; $A^1 A^1$, the flues; and $A^2 A^2$, the grate bars, all of which are constructed in the usual manner, and may be of any desired form or pattern. B is the still, and is provided with a cone-shaped steam-worm, $B^1$, which is arranged within the still, as shown in Fig. 1; although in the working apparatus additional coils may be used so as to bring the lower of the series of pipes nearer the concave surface or base of the still. The dimensions of this worm should be such as not only to insure the emission therefrom of the largest quantity of heat, but also to provide the greatest amount of heating-surface for the fumes and partially-vaporized liquid to travel through, and consequently impinge against, and which surface the irregular form of the coil provides, which tends greatly to facilitate the quick and thorough evaporation of the entire mass. The lower section of the still is inclosed in a jacket, C, which is relatively so arranged in connection with the still as to leave a super-heating steam-chamber, $C^1$. This chamber is connected with the interior chamber of the still by means of openings $c\ c$, into which lead the angular supporting-pipes $b\ b$ of the worm, and which are merely a continuation of the coils of pipe which form said worm. This chamber $C^1$ is supplied with steam from a boiler by means of any suitable pipe, the steam entering the chamber on the rear side of the still. There being no novelty in either the boiler or pipe, nor in their arrangement or connection, it is not deemed necessary to show the same on the drawing. $C^2$ is a cock for drawing off any condensed water and sediment that may remain in the chamber; and in addition the chamber $C^1$ may be provided with a safety-valve. D is a liquidizing-tub, which is constructed out of any suitable material, and may be of any desired dimensions or capacity. This tub is provided with man-holes E $E^1$, the first for the admission of the crude material, and $E^1$ to allow access to the tub for cleaning the same, its strainers, &c. $d\ d$ are independent steam-jets which enter through the wall of the tub, and are designed to act with a constant raking action, as it were, on the crude turpentine as the agitator continuously stirs the same. F F are the cross-bars of the agitator, and are attached to a vertical shaft, $F^1$, which is secured, so as to revolve freely, in suitable bearings at the centers of the upper and lower sections of the tub D. The arms F F of the agitator are constructed out of any suitable material, and are slightly tapering in form from their center openings, through which the shaft passes, toward their outer ends, at which they terminate in rectangular heads. The reverse face of the sections of each arm is flat, and is braced by a rib at its back, the base of the rib of one section being on a line with the flat face of the other. These arms are arranged in pairs or sets at right angles to each other, and the different sets so arranged in relation to each other that the arms of each two of the series shall form angles of about forty-five degrees.

The great advantage of thus forming the agitator is that it provides an immense stirring surface, together with great strength, and insures, in operation, the entire disintegration of the whole mass, which allows of it being raked in broken portions, as it were, by the jets of steam, and which renders the action of both the steam and the heat so much the more direct, and consequently more effective.

Immediately connected with the tub D, and forming part of the same vessel, is a reservoir or chamber, G, which receives the crude turpentine after the same has been properly liquidized in the tub, it passing thereto through the opening $g$, which is inclosed by strainers or filterers $g^1$ $g^2$, the upper strainer being slightly convex in form, while the lower one is slightly concave. The upper filter, $g^1$, is coarser than the lower one, $g^2$, and while their double action insures that the grosser impurities shall be retained in the tub it also frees the liquid of the lesser impurities, retaining the same in the strainer, and thus the liquid fed to the reservoir is supplied in, comparatively speaking, a pure condition. This opening $g$, which leads from the tub D to the reservoir G, is opened and closed at pleasure by means of the sliding valve $d'$, which is operated by the valve-rod and lever $f^2$. The arrangement of strainers, valves, &c., is all clearly shown in Fig. 2. $E^2$ is a man-hole, which allows access to the same for the purposes of cleaning it, and $E^3$ is a steam blow-out pipe, which is also useful in cleaning the reservoir. From this reservoir G, as required, the liquid is fed to the interior chamber of the still by means of the jacketed pipe H, which leads into the reservoir G through the opening $H^1$, and which is also capped with a strainer or filterer, $h$. This jacketed pipe H has cocks $H^2$ $H^2$ for drawing off condensed steam. This opening $H^1$ is closed and opened at pleasure by means of a sliding valve, $h^1$, and a valve rod and lever $h^2$. The tub D and reservoir G are supported on any suitable frame-work, and are arranged so as to allow of the ready flow of the liquid from one to the other, and thence to the still. K is a pipe that carries off the superheated steam from the worm $B^1$. This pipe is bent, as shown at $K^1$, Fig. 1, running in a zigzag direction, and serves to supply an additional heat to the dome section of the still-chamber, to which the vapor, as fast as it is generated, ascends, and from which, by the pipe $L^1$, it is immediately conveyed to the separator. This pipe K is provided with an egg-shaped or expanding joint, $k$, which, being distinctly claimed in my reissue before referred to, needs no further description here, as its operation and use in both instances are precisely similar. This pipe K leads directly to the reservoir G, where it forms a steam-coil, $K^2$, and from whence it passes to the tub G, where it forms the steam-coil $K^3$. The condensed steam that is fed to the worm in the still is thus made, by means of the pipe K and its bent section $K^1$, and the steam-coils $K^2$ $K^3$ formed therein or connected therewith, to supply an additional heat to the upper section or dome of the still where the vapor gathers, and also to furnish the requisite heat for the reservoir G and tub D, and thence, by means of the cock $K^4$, fed to any suitable engine. From the center of the dome of the still leads the vapor goose-neck L, to which is secured the pipe $L^1$, and which is also provided with an egg-shaped or expanded joint, $l$. This pipe extends diagonally through the reservoir G, and conveys the vapor as rapidly as generated in the still directly to the base of the separator M, into which also leads the pipe $D^1$ from the liquidizing-tub D, and which pipe conveys the vapor received from the pipe $D^2$, and which pipe communicates with the reservoir G. This last-mentioned pipe is furnished with a valve, $D^3$, by means of which, when desired, the pipe can be closed. These pipes $D^1$ $D^2$ are essential to the proper development of the principle of my inventions, or improvements in distillations, and which, in addition to separating the pyroligneous acid from the turpentine while in vapor, has, as a leading feature, the evaporation of the crude material at the lowest possible degree of heat. To do this I distribute the heat, and thus in a degree, at least, render the liquidizing-tub and reservoir vaporizing-chambers, as well as the still, and so soon as vapor is produced in either a means of escape is provided, and, without being an instant longer subjected to heat, the same is immediately conveyed to the separator M. $x$ $x$ are thermometers, (one in the still B and one in the tub D,) and serve to indicate the temperature of each vessel. Through the dome of the still enters a tube, $y$, which is provided with a screw-cap so arranged as to form a perfectly-tight connection with the tube. This tube extends down into the chamber of the still such a distance as to insure during the operation of the still that its lower opening shall be always embedded in the liquid, and which permits of the proof-stick being inserted at pleasure, simply by undoing the screw-cap to test the contents of the still without the possibility of any of the vapor escaping.

A similar tube, $y$, may be used in connection with the tube D.

The separator M and condenser N, and the vessels O P, being precisely similar in construction, and operating exactly in the manner described and claimed in my reissue of April 15, 1873, I will not describe them here, but simply show their action hereafter in connection with the operation of the entire apparatus, which I will now proceed to describe.

The crude material is supplied to the tub D through the man-hole E; and steam is supplied to the jets $d\ d$ and to the chamber C'. In the latter instance it is superheated in its passage through the chamber, and ascends, by the openings $c\ c$, to the worm $B^1$, and thence, by the pipe K, is conveyed to the coils $K^2\ K^3$, thus heating the reservoir G and the tub D.

This steam may be conveyed directly to the engine that drives the shaft F' of the agitator; or that power may be supplied from another source.

The entire apparatus is now ready for operation. The rapid revolution of the agitator completely stirs and breaks up the entire mass, subjecting each and every particle of the crude material to the direct action of the heat thrown off from the coil $K^3$, and to the raking action of the steam-jets $d\ d$, which insures the entire permeation of the whole mass. The result is the crude material, under the combined action of the agitator, coil, and steam-jets, is rapidly and speedily liquidized, whatever of vapor may have been generated being passed immediately to the separator M through the pipe D'. By means of the valve-rod and lever $j^2$ the sliding valve $d^1$ is opened, and the properly-liquidized crude material passes through the strainers $g^1\ g^2$ and opening $g$ to the reservoir G, and is received into this reservoir, comparatively speaking, freed from all foreign substances and other impurities which the strainers $g^1\ g^2$ have caught and retained. So soon as the liquid has run off the valve $d'$ is closed, and the tub D is again charged with crude material.

Thus it will be seen that the uninterrupted action of the tub in liquidizing the crude material is provided for.

The liquid in the reservoir is kept properly heated by means of the superheated steam in the coil $K^2$; and the heat thrown off from the vapor-tube L' leading from the still, and which runs diagonally through the reservoir, as clearly shown in Fig. 2. The heat emitted from these two sources, the coil $K^2$ and vapor-tube L', is frequently of a degree so intense as to vaporize a portion of the liquid, which is immediately carried, by the pipes $D^1\ D^2$, to the separator M, the valve $D^3$ being opened so as to allow of its free escape. The main portion of the liquid, or that portion which has not been vaporized in the reservoir, is fed to the still, as occasion requires, simply by opening the valve $h'$, the liquid passing through the strainer $h$, and again filtered, and thence through the opening $H^1$ and the jacketed pipe H. The liquid enters the still at its dome, and the heat from the superheating steam-chamber $C^1$ and the worm $B^1$, in connection with the irregular heating-surfaces which the coil of the worm furnishes for the liquid and vapor to flow over, arise through and, consequently, impinge against, causes the thorough evaporation of the turpentine to take place at a degree of heat far below that required to accomplish the same result in any apparatus now in use.

The advantage of this evaporation at so low a temperature cannot be overestimated, as it not only preserves, in all its vitality, each valuable element or quality of the crude turpentine, but it also secures the thorough evaporation of the liquid without blackening the resin or residuum, which is the case in all other stills. Instead of drawing off from the still black resin, which is of little or no value, I draw off an article equal, if not superior, to the pale resin made from "virgin dip," and which, as is well known, commands the highest market price. The vapor, as rapidly as it is generated, is carried by the pipe L' to the separator M, entering at the base thereof, and is, in its passage through the same, freed from the pyroligneous acid, which, being heavier, flows back, while the vapor ascends to the dome, and is carried by the pipe M' to the condenser N, and from thence by the pipe N' to the vessel O, in which the turpentine is separated from the condensed water, the former passing to the vessel P through the pipe O', from which it is barreled.

The operation of the separator, condenser, and the vessels O P being precisely the same as in my reissue, before referred to, a further description of the same is unnecessary.

What I claim as new, and desire to secure by Letters Patent of the United States, is—

1. The still B, having a jacket, C, arranged in connection therewith, forming a superheating steam-chamber, $C^1$, and the circular cone-shaped worm, $B^1$, the same being connected, combined, and arranged to operate substantially as described.

2. In combination with the worm $B^1$, the pipe K, having coils $K^2\ K^3$ formed therein or connected therewith, the whole being arranged so that the superheated steam from the coil shall serve as the heating-medium for the reservoir G and tub D, substantially as described.

3. The reservoir G, still B, jacketed pipe H, sliding valve $h'$, and strainer $h$, the same being constructed, combined, and arranged to operate substantially as described.

4. The liquidizing-tub D, reservoir G, sliding valve $d'$, and double strainer $g^1\ g^2$, the whole being constructed, combined, and arranged to operate substantially as described.

5. The revolving agitator or stirrer herein described, consisting of the shaft F', and the series of independent arms F F, formed as shown, the whole constructed and combined to operate substantially as set forth.

6. The liquidizing-tub D, agitator F F', and independent steam-jets $d\ d$, the same being combined and arranged to operate substantially as described.

7. The still B, tub D, reservoir G, separator M, and pipes L $D^1\ D^2$, the whole being constructed, combined, and arranged to operate substantially as described.

In testimony whereof I have signed my name to this specification in the presence of two subscribing witnesses.

ARCHIBALD K. LEE.

Witnesses:
EDWIN JAMES,
JOS. T. K. PLANT.